(12) United States Patent
Luebke et al.

(10) Patent No.: US 8,383,026 B1
(45) Date of Patent: Feb. 26, 2013

(54) FABRICATION OF FIBER SUPPORTED IONIC LIQUIDS AND METHODS OF USE

(75) Inventors: David R. Luebke, Bethel Park, PA (US); Shan Wickramanayake, Pittsburgh, PA (US)

(73) Assignee: U.S Department of Energy, Washington, DC (US)

(*) Notice: Subject to any disclaimer, the term of this patent is extended or adjusted under 35 U.S.C. 154(b) by 371 days.

(21) Appl. No.: 12/909,180

(22) Filed: Oct. 21, 2010

(51) Int. Cl.
*D01D 5/06* (2006.01)
*B01D 53/04* (2006.01)
*B01D 53/22* (2006.01)

(52) U.S. Cl. ........... 264/178 R; 264/172.16; 264/178 F; 264/203; 95/45; 95/51; 95/90; 95/139

(58) Field of Classification Search .......... 96/8, 10, 96/11, 12, 153; 95/45, 51, 90, 139; 264/171.26, 264/172.16, 178 R, 178 F, 203
See application file for complete search history.

(56) References Cited

U.S. PATENT DOCUMENTS

| | | | | |
|---|---|---|---|---|
| 5,102,601 | A * | 4/1992 | Farris et al. ................. | 264/183 |
| 6,086,769 | A * | 7/2000 | Kilambi et al. .............. | 210/638 |
| 6,579,343 | B2 | 6/2003 | Brennecke et al. | |
| 7,601,771 | B2 * | 10/2009 | Schmidt et al. .............. | 524/106 |
| 7,666,499 | B2 * | 2/2010 | Jung et al. .................... | 428/364 |
| 7,938,890 | B2 * | 5/2011 | Littau et al. ................... | 96/4 |
| 7,938,891 | B2 * | 5/2011 | Littau ........................... | 96/5 |
| 7,938,892 | B2 * | 5/2011 | Littau ........................... | 96/5 |
| 7,943,543 | B1 * | 5/2011 | Liu et al. ....................... | 502/4 |
| 8,043,418 | B2 * | 10/2011 | Ruud et al. .................... | 96/4 |
| 2009/0025555 | A1 | 1/2009 | Lively et al. | |
| 2009/0305871 | A1 * | 12/2009 | Perera et al. .................. | 502/60 |
| 2010/0090365 | A1 * | 4/2010 | Schuette et al. ............. | 264/178 F |
| 2010/0132559 | A1 * | 6/2010 | Ishida et al. .................. | 96/5 |
| 2012/0132589 | A1 * | 5/2012 | Hamad et al. ................ | 210/640 |

OTHER PUBLICATIONS

Huang et al., "Studies on Solvent Evaporation and Polymer Precipitation Pertinent to the Formation of Asymmetric Polyetherimide Membranes," Journal of Applied Polymer Science, vol. 57 (1995).
Matsumoto et al., "Confinement of Ionic Liquid by Networked Polymers Based on Multifunctional Epoxy Resins," Macromolecules 2008, 41, 6981-6986.
Reiter et al., "Ternary polymer electrolytes with 1-methylimidazole based ionic liquids and aprotic solvents," Electrochimica Acta 52 (2006) 1398-1408.
Bara et al., "Room-Temperature Ionic Liquids and Composite Materials: Platform Technologies for CO2 Capture," Accounts of Chemical Research, Jan. 2010, vol. 43, No. 1.

* cited by examiner

*Primary Examiner* — Robert Clemente
(74) *Attorney, Agent, or Firm* — James B. Potts; Mark P. Dvorscak; John T. Lucas

(57) ABSTRACT

One or more embodiments relates to the production of a fabricated fiber having an asymmetric polymer network and having an immobilized liquid such as an ionic liquid within the pores of the polymer network. The process produces the fabricated fiber in a dry-wet spinning process using a homogenous dope solution, providing significant advantage over current fabrication methods for liquid-supporting polymers. The fabricated fibers may be effectively utilized for the separation of a chemical species from a mixture based on the selection of the polymer, the liquid, and the solvent utilized in the dope.

20 Claims, 3 Drawing Sheets

FABRICATION OF FIBER SUPPORTED IONIC LIQUIDS AND METHODS OF USE

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments relates the production of a fabricated fiber having an asymmetric polymer network and having ionic liquid such as an immobilized ionic liquid within the pores of the polymer network. The process produces the fabricated fiber in a dry-wet spinning process using a homogenous dope solution. The dope is extruded through a spinneret over a displacement distance in a gaseous environment in order to form a polymer-rich region around the periphery of the nascent fiber, then immersed in a coagulation bath of non-solvent in order to co-precipitate a porous polymer network and immobilized liquid within the pores. The method provides significant advantage over current fabrication methods for liquid-supporting polymers. The fabricated fibers may be effectively utilized for the separation of a chemical species from a mixture based on the selection of the polymer, the liquid, and the solvent utilized in the dope.

BACKGROUND

The use of polymers in separation processes is well known in a variety of industries from water treatment to industrial gas separations. The polymers generally accomplish separation through a solution-diffusion mechanism when utilized as a non-porous material, and through molecular sieving or Knudson diffusion when utilized as porous materials. Additionally, polymers have been fabricated for a combination of porous and non-porous behaviors with a morphology characterized as asymmetric. An asymmetric polymer material is generally characterized by a dense thin film providing high selectivity, and supported by a porous polymeric network having high permeability. In polymer membranes utilized for gas separations, the asymmetric morphology is advantageous in that it allows a component selectively passed through the dense layer to proceed through the lower structure with minimized resistance.

In polymer membranes utilizing an asymmetric morphology, it is important that the preferred component diffuse through the dense layer at a sufficient flow rate, which makes if desirable to keep the thickness of the dense layer as small as possible. Additionally, typically the dense film cannot have a porous surface in order to preserve the inherent selectivity of the dense film in gas separation operations. These two requirements present significant difficulty in connection with the fabrication of the asymmetric morphologies, since dense films of a thickness of 1 micron or less can rarely be manufactured without flaws. Fabrication of asymmetric morphologies having a thin and defect-free dense film has been an area of significant effort. These methods frequently employ a dry-wet spinning process using a dope containing swelling agents in order to provide for formation of the dense skin in the dry air gap, followed by precipitation of a porous polymer matrix in the coagulation bath. The swelling agent is miscible with the non-solvent in the coagulation bath in order to produce the dense film supported by the porous polymer network. The See e.g., U.S. Pat. No. 4,673,418 to Peinemann, issued Jun. 16, 1987, among others. In these fibers, where the selectivity of the dense layer provides for gas separation, the exceedingly small dimensions of gas molecules make the presence of even Angstrom size pores in the separation layer unacceptable, and the emphasis is on formation of the defect-free dense film.

It would be advantageous to provide a fiber having an asymmetric morphology which is less sensitive to the presence of defects within the dense film for satisfactory separation operations. It would be further advantageous if a well known technology such as dry-wet spinning could be utilized to fabricate the fiber.

In order to combat the requirement for defect-free dense films, polymer fiber structures have also been utilized as supporting contactors between a gaseous mixture and a supported carrier or sorbent. Typically a sorbent or transport medium is supported by a hollow fiber structure, in order to take advantage of the contact area per unit volume ratio afforded by the hollow fiber geometry. The sorbent-supporting fibers may be fabricated with an asymmetric morphology having a dense film, or may utilize an essentially uniform porosity through the fiber in order that a multi-component mixture permeates the fiber surface and encounters the supported sorbent. In the latter case, unlike the purely polymeric fibers, the sorbent-supporting polymer mainly provides structural support, since the composite material relies on the supported material to provide selectivity.

In the sorbent-supporting fibers, the supported sorbents may be a solid or liquid sorbent. Solids sorbents typically produce hybrid materials with the solid sorbents entrapped within the pores of a porous polymer matrix. See e.g., U.S. patent application Ser. No. 12/163,140 filed by Lively, filed Jun. 27, 2008, published Jan. 29, 2009. These materials utilize a "sieve in a cage" morphology where discontinuous physical contact exists between the dispersed solid particles and the polymer matrix. The discontinuous physical contact holds the solid particle in place while allowing for facile gas bulk diffusion throughout the interconnected pore structure of the fiber, in order to avoid occluding access to the pores of the sorbents. The solid particle sorbents are selected based on sorption capacities for a given chemical species that vary with respect to temperature, and separation of the given chemical species occurs through sorption/desorption using a temperature swing process. These systems also commonly detail a hollow fiber geometry, so that necessary heat transfers may occur from or to a fluid flowing through the interior of the hollow fiber.

These hybrid membranes utilizing solid sorbents often fall short of predicted separation performances due to polymer rigidization and poor polymer/sorbent contact arising as a result of fabrication methodologies. Generally, the solid supporting fibers are fabricated by dispersing the solids in a polymer dope and extruding the mixture in a spinning process, so that the porous polymer network forms through solvent separation in the presence of the solids to be supported. The nature of this arrangement leads to localized stresses as the polymer contracts around the solid sorbent in the membrane. Compressive stresses can lead to rigidification of the polymer matrix around the sieve, leading to lower diffusivity in that region, while tensile stresses can lead to delamination of the polymer and the solid sorbent, resulting in gaps at the interface. See e.g., Das et al., "Gas-Transport-Property Performance of Hybrid Carbon Molecular Sieve-Polymer Materials", *Ind. Eng. Chem. Res.* 49 (2010).

When liquids are utilized to fill the pores of the polymer supporting matrix, the hybrid material typically functions as a membrane, with separation of a chemical species from a mixture occurring simultaneously with removal of the chemical species from the membrane at another membrane boundary. In hollow fiber geometries, typically the exterior of the hollow fiber is exposed to the gaseous flow containing the chemical species to be separated, and separated species is removed through the interior of the hollow fiber. In many cases, the liquid contained within the fiber is a reactive solution, and the separation occurs by facilitated transport. The facilitated transport process is based on absorption of the chemical species by the liquid at pores on the exterior surface, reaction of the species with a chemical component present in the liquid, transport of the resulting chemical complex by diffusion through the liquid-filled pore network, decomplexation to form the original chemical species, and release into the hollow interior of the fiber. This approach increases the flux through the membrane and enhances selectivity; however, the finished products generally suffer from membrane instability arising due to gradual loss of the liquid membrane. The principal mechanisms leading to this loss may include the solubility of the carrier and its diluent in the feed and strip fluids in the case of liquid/liquid separations, volatilization of the carrier or its diluent in the case of gas/gas separations, or capillary displacement as a result of an osmotic pressure differential between the two sides of the membrane. Various methodologies have been employed to combat the liquid loss. See e.g., U.S. Pat. No. 6,086,769 to Kilambi et al., issued on Jul. 11, 2000, among others. Additionally, fabrication of the liquid-filled polymers has been limited to methodologies where fiber fabrication occurs as a separate spinning step, and filling of the porous polymeric network occurs by soaking the finished fiber in the liquid to be supported for a sufficient time.

It would be advantageous to provide a fiber containing an immobilized liquid within the pores of a porous polymeric network which could be produced without reliance on the two separate fabrication steps of spinning and soaking. Simpler fabrication could provide for utilization of liquid supporting fibers on a wider scale. Additionally, the immobilization of a liquid in the simpler fabrication would avoid the issues associated with the reduced performance of solid supporting fibers, such as reduced diffusivity and delamination.

Ionic liquids have been utilized as a solvent for gaseous separation in supported ionic liquid membranes (SILM) utilizing porous polymer networks. See e.g., U.S. Pat. No. 6,579,343 issued to Brennecke et al., issued Jun. 17, 2003. However, the ionic liquids are typically incorporated into the porous polymer network by a soaking process, which requires an interconnected polymer network having sufficient fluid communication with the external environment in order for a successful soaking step. The substantial transmembrane pressure combined with fluid communication to the environment can lead to relatively rapid ionic liquid loss and ineffectiveness of the hybrid material. It would be advantageous to provide a process whereby an ionic liquid could be immobilized in a porous polymer network without reliance on the soaking step and without the necessity for fluid communication between the porous network and the external environment, in order to mitigate ionic liquid losses during operation.

Accordingly, it is an object of this disclosure to provide a method for production of a fabricated fiber comprised of a porous polymer network and an immobilized ionic liquid within the pores of the network.

Further, it is an object of this disclosure to provide a method for production of a fabricated fiber comprised of a porous polymer network and an immobilized ionic liquid within the pores of the network, where the porous polymer network is asymmetric to mitigate loss of the ionic liquid to a surrounding environment.

Further, it is an object of this disclosure to provide a method for production of a fabricated fiber comprised of an asymmetric polymer network and immobilized ionic liquid utilizing a dry-wet spinning process, in order to avoid separate fabrication steps of fiber spinning and subsequent ionic liquid soaking.

Further, it is an object of this disclosure to provide a method for production of a fabricated fiber comprised of an asymmetric polymer network and immobilized ionic liquid, where the fabricated fiber is suitable for use in the separation of specific chemical species from a mixture.

Further, it is an object of this disclosure to provide a method for production of a fabricated fiber comprised of an asymmetric polymer network and immobilized ionic liquid, where the fabricated fiber is suitable for use in the separation of specific chemical species from a mixture, and to provide a method of facilitating the separation utilizing the fabricated fiber.

These and other objects, aspects, and advantages of the present disclosure will become better understood with reference to the accompanying description and claims.

SUMMARY

The process as disclosed here provides a method for production of a fabricated fiber comprised of a porous polymer network and an immobilized liquid within the pores of the network using a dry-wet spinning process. The resulting fabricated fiber may be comprised of an asymmetric polymer network which provides support to and immobilizes an ionic liquid within the pores of the porous polymer network. The immobilized liquid may be utilized to accomplish various operations based on selection of materials comprising a spinning dope. For example, a fabricated fiber may be tailored to provide for separation of a chemical species by utilizing an ionic liquid having an absorption coefficient for the chemical species. In operation, the ionic liquid may serve as a sorbent undergoing cyclic sorption/desorption cycles, or may serve as conduit through which the chemical species passes in a membrane-type operation. An advantage of the fabricated fiber is a high surface-to-volume ratio over that which might otherwise be available in an operating environment, such as a spray tower.

The fabricated fiber may be produced by dry-wet spinning of a dope solution comprised of a polymer, an ionic liquid, and a solvent. The polymer is poorly soluble in the ionic liquid, and the polymer and the ionic liquid are both soluble in the solvent. In the dry-wet spinning process, the dope is extruded through a spinneret into a gaseous environment to form a nascent fiber, resulting in some degree of solvent evaporation and a higher local polymer concentration in the outermost region of the nascent fiber as compared to the bulk of the dope. Subsequently, the nascent fiber is introduced to a coagulation bath.

In the coagulation bath, solvent diffuses out of the forming fiber and co-precipitation of the polymer and the ionic liquid occurs. As a result of the diffusion and co-precipitation, the ionic liquid is immobilized within the pores of the fabricated fiber. Retention of the ionic liquid in the fiber is enhanced by the presence of the thin film formed around the periphery of the fabricated fiber, as a result of the dry-wet spinning method.

The fabricated fiber produced by the method disclosed may be advantageously used for the production of fibers utilized in the separation of a chemical species from a mixture, when the ionic liquid has an effective absorption coefficient for the chemical species. For example, a fabricated fiber may be designed for the removal of $CO_2$ from a mixture such as a flue gas. When the ionic liquid has a varying sorption capacity for the chemical species as a function of temperature, the fabricated fiber may be exposed to the mixture at a first temperature, resulting in uptake of the chemical species from the mixture, followed by altering the temperature of the fabricated fiber to alter the sorption capacity and generate release of the chemical species. When the fabricated fiber is a hollow fiber, the temperature of the fabricated fiber may be altered through thermal interaction with a fluid flowing through the hollow interior.

The process as disclosed thereby provides a fabricated fiber having a thin skin around the periphery of the fiber and supported by a porous polymer network, where the porous polymer network contains immobilized liquid, such as an immobilized ionic liquid. The process produces the fabricated fiber in a dry-wet spinning process using a homogenous dope solution. The method provides significant advantage over current fabrication methods for liquid-supporting polymers, including more rapid fabrication and improved retention of the ionic liquid over operational cycles. The fabricated fibers may be effectively utilized for the separation of a chemical species from a mixture based on the selection of the polymer, the liquid, and the solvent utilized in the dope The novel process and principles of operation are further discussed in the following description.

DETAILED DESCRIPTION

Figure 1:
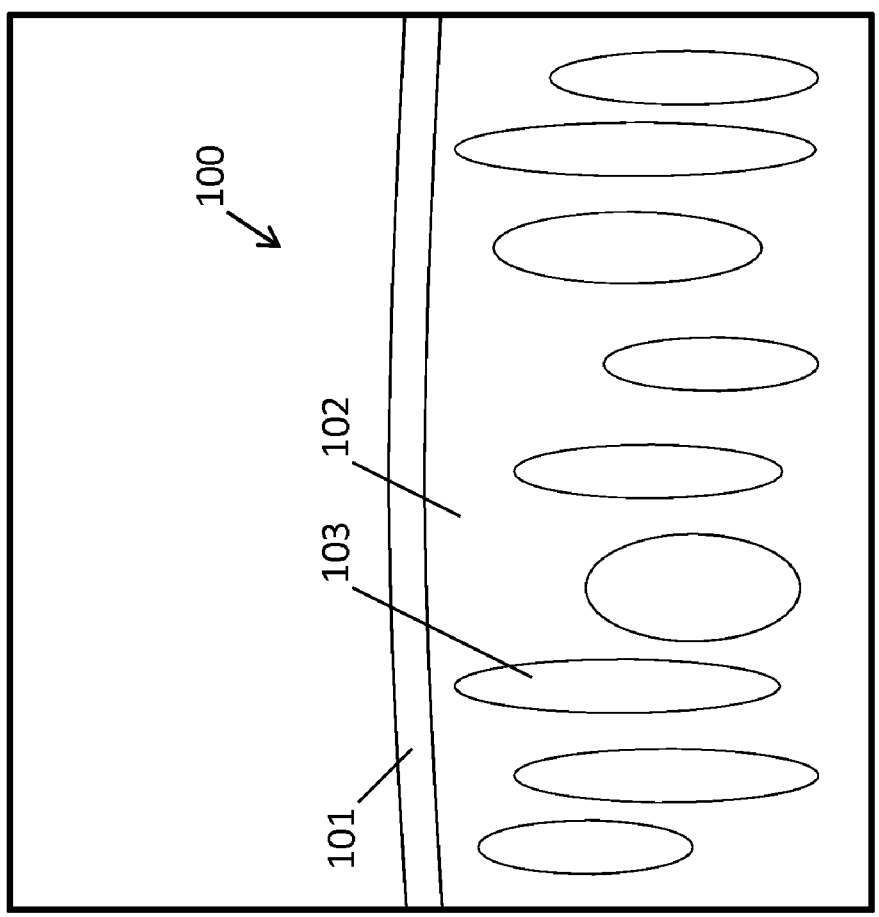
FIG. 1 illustrates a schematic representation of an asymmetric polymer structure.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a process whereby a fabricated fiber comprised of a porous polymer network and an immobilized liquid within the pores of the network may be fabricated using a dry-wet spinning process.

The process as disclosed here provides a method for production of a fabricated fiber comprised of a porous polymer network and an immobilized ionic liquid within the pores of the network using a dry-wet spinning process. The resulting fabricated fiber is comprised of an asymmetric polymer network, mitigating loss of the ionic liquid to a surrounding environment. A thin film comprising the asymmetric network and surrounding the fabricated fiber may be defect free, or may contain ionic-liquid filled pores in fluid communication with the surrounding external environment. The process further provides a method for production of a fabricated fiber comprised of a porous polymer network and an immobilized liquid within the pores of the network using a dry-wet spinning process, such that the fabricated fiber has a high surface-to-volume ratio over that which might otherwise be permissible in certain operating environments, such as a spray tower.

The dry-wet spin process may utilize a dope comprised of a polymer, an ionic liquid, and a solvent. The polymer and the ionic liquid are poorly soluble with respect to each other, and the solvent dissolves both the polymer and the ionic liquid to form a homogenous solution. The dope is extruded through a spinneret into a gaseous environment followed by a coagulation bath, resulting in formation of the thin film and liquid-liquid demixing of the polymer and the ionic liquid from the homogenous solution. Co-precipitation of the polymer and the ionic liquid in the coagulation bath provides the fabricated fiber having an asymmetric porous polymer network and immobilized ionic liquid within the pores.

The fabricated fiber may be utilized for a variety of separation operations based on the material selection of the dope components. In an embodiment, the material selection results in a fabricated fiber suitable for separation of $CO_2$. In another embodiment, the fabricated fiber has a hollow geometry providing for regeneration of an immobilized ionic liquid through heat transfer with a fluid flowing through the hollow interior, following sorption of a specific chemical species.

Within this disclosure, the term "poorly soluble" with respect to a particular solute and solvent means an equilibrium concentration of less than 100 parts-per-million solute in a solution of the solute and the solvent. For example, within this disclosure, when a polymer is poorly soluble in an ionic liquid, the equilibrium concentration of the polymer in a polymer-ionic liquid solution is less than 100 parts-per-million.

Within this disclosure, the term "soluble" with respect to a particular solute and solvent means an equilibrium concentration of greater than 10 weight percent (wt %) solute in a solution of the solute and a solvent. For example, within this disclosure, when a polymer is soluble in a solvent, the equilibrium concentration of the polymer in a polymer-solvent solution is greater than 10 wt % polymer.

Within this disclosure, the term "ionic liquid" means a nonpolymeric salt comprising an organic cation and any variety of anions that is reasonably fluid at temperatures under about 100° C. The salt may contain monovalent or polyvalent anions or cations, and may be a single salt or a mixture of salts.

Within this disclosure, the term "polymer" means a naturally occurring or synthetic compound consisting of large molecules made up of a linked series of repeated simple monomers.

Within this disclosure, the term "nascent fiber" refers to a structure generated when a spinning dope is extruded through a spinneret into a gaseous environment, and prior to immersion in a coagulation bath.

Within this disclosure, the term "forming fiber" refers to a structure immersed in a coagulation bath, where the forming fiber was a nascent fiber prior to immersion.

Within this disclosure, the term "fabricated fiber" refers to a structure removed from a coagulation bath, where the fabricated fiber was a forming fiber prior to removal.

FIG. 1 shows a schematic cross-sectional view of a section of a fabricated fiber 100. Fabricated fiber 100 has an dense thin film layer 101 arranged over a porous polymer network 102. Geometrically, the porous polymer network 102 provides mechanical support to the fabricated fiber 100 and additionally serves as interstitial material surrounding embedded pores, such as pore 103. Exemplary dimensions for a fabricated fiber such as fabricated fiber 100 might be a fiber diameter of approximately 750 μm and a thickness of thin film 101 of approximately 0.1 μm, although this is not intended to be limiting.

Generally speaking, fabricated fiber 100 demonstrates the structure typically referred to as asymmetric, where a dense layer is arranged on the surface and supported by a porous substructure. This arrangement is frequently utilized in membranes, where the dense layer provides a selective separation layer and the porosity level of the lower structure provides for membrane support with a structure having high permeability. This morphology is intentional is order to allow a component selectively passed through the dense layer to proceed through the lower structure with minimized resistance. Typically, when the selectivity of the dense layer is utilized for gas separations, the exceedingly small dimensions of gas molecules combined with the low cohesive forces of gases make the presence of even Angstrom size pores in the separation layer unacceptable. An advantage of the disclosure herein is the decoupling of the pore size in thin film 101 with the selectivity of the resulting fiber, by the inclusion of a liquid such as an ionic liquid within the pores of fabricated fiber 100. At FIG. 1, fabricated fiber 100 is further comprised of an ionic liquid immobilized within the pores, such as pore 103. A further advantage is the use of the immobilized liquid in order to mitigate the impact of defects in the dense layer, such as thin film 101. A further advantage is the production of fabricated fiber 100 having a high surface-to-volume of the immobilized liquid within the pores, such as pore 103.

Fabricated fiber 100 may thus provide support to and immobilize an ionic liquid within a porous polymer network. The ionic liquid may be utilized to accomplish various operations. For example, fabricated fiber 100 may provide for gas separations when thin film 101 results from precipitation of a polymer that transfers a chemical species, and when the ionic liquid immobilized within the pores of the porous polymer network has an absorption coefficient for the chemical species. In such an operation, the ionic liquid may serve as a sorbent undergoing cyclic sorption/desorption cycles, or may serve as conduit through which the chemical species passes in a membrane-type operation.

Within this disclosure, the size of a pore such as pore 103 is not limiting. Pore 103 may be a microvoid or a macrovoid as those terms are used the art, or may have dimensions falling between those designations. Within this disclosure, it is only necessary that a pore such as pore 103 contain an immobilized liquid such as an ionic liquid as a result of the production process disclosed herein. Further, the presence or absence of defects in thin film 101 is not limiting. In certain applications a defect-free thin film may be advantageous; however, the fabricated fiber produced by the method disclosed may or may not have defects present.

A novel aspect of the disclosure is the production method for producing a fabricated fiber comprised of a porous polymer network and an immobilized ionic liquid, such as fabricated fiber 100. The fabricated fiber is produced by the dry-wet spinning of a dope comprised of a polymer, an ionic liquid, and a solvent. The polymer is poorly soluble in the ionic liquid and the polymer and the ionic liquid are both soluble in the solvent. The fabricated fiber is formed by discharging the dope through a spinneret into a gaseous environment to form a nascent fiber having a polymer rich region around the outer periphery, followed by immersion in a non-solvent coagulation bath. The non-solvent is miscible with the solvent, and a dual precipitation within the forming fiber produces a porous polymer network supporting immobilized ionic liquid within the pores. In providing a dry-wet spinning methodology for the production of fibers such as fabricated fiber 100, the disclosure significantly eases the typical production challenges associated with fabrication of polymer supported ionic liquid structures.

Figure 2:
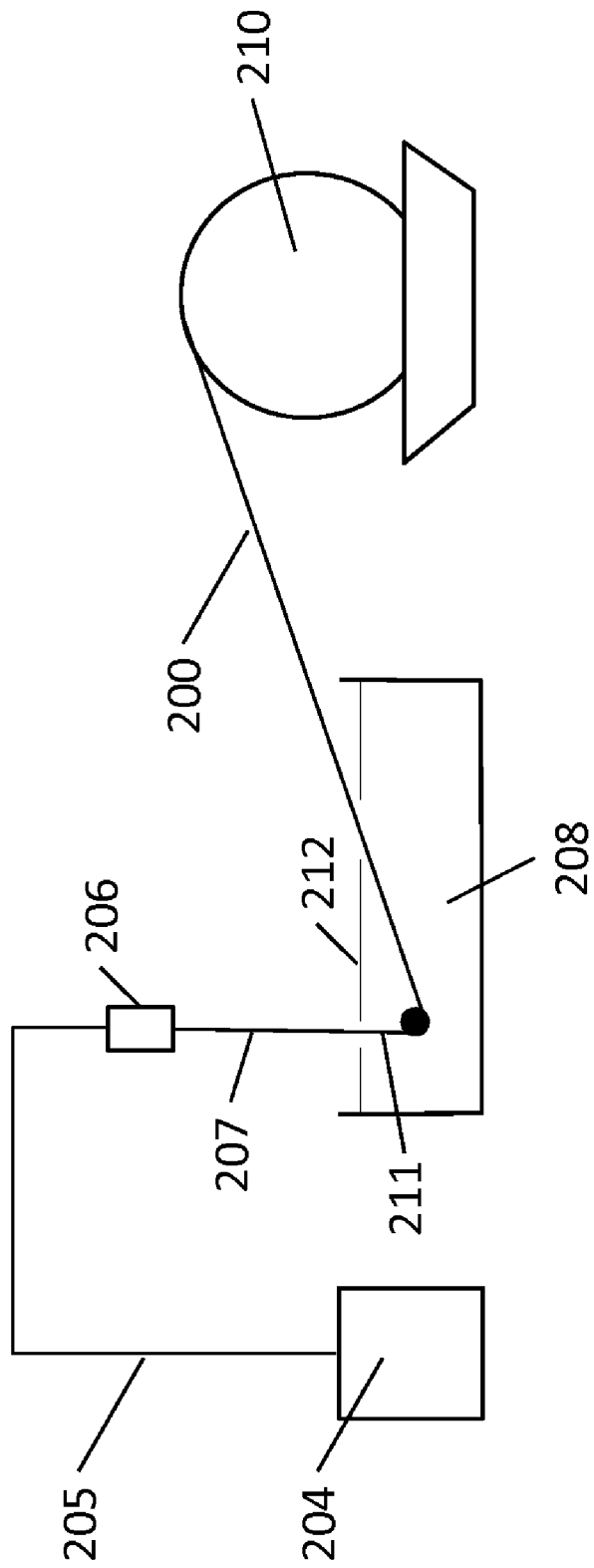
FIG. 2 illustrates a representative dry-wet spinning process.

The production methodology is discussed with reference to FIG. 2. FIG. 2 schematically represents a dry-wet spin process. A dope 204 is comprised of a polymer, an ionic liquid, and a solvent. The polymer is poorly soluble in the ionic liquid, and the polymer and the ionic liquid are both soluble in the solvent. Dope 204 is thermodynamically stable solution comprised from the polymer, the ionic liquid, and the solvent.

Dope 204 is transferred to spinneret 206 via pathway 205. Dope transport may be accomplished using a pressurized gas, a pump, or other means known in the art. Dope 205 is extruded through spinneret 206 into a gaseous environment over a displacement distance between spinneret 206 and coagulation bath 208. Nascent fiber 207 forms over the displacement distance following discharge from spinneret 206.

Without being bound by theory, it is generally accepted that skin formation begins over the displacement distance as a result of solvent evaporation in the gaseous environment, resulting in a higher local polymer concentration in the outermost region of a nascent fiber as compared to the bulk of the dope. The region of increased polymer concentration is typically very thin since residence time in the displacement distance between the spinneret and the coagulation bath is typically extremely short in a dry-wet spinning operation. Hypothetically, when the outer surface of the fiber with a locally high polymer concentration enters the coagulation bath, the initially high polymer concentration on the surface of the nascent fiber produces a lower fraction of polymer-lean phase when phase-separated in the coagulation bath, leading to a higher density in the skin as compared to the substructure. However, the particular mechanism by which a thin film such as thin film 101 forms is not limiting. Within this method, it is only necessary that the dope be extruded through spinneret 206 into a gaseous environment over a displacement distance, and that some portion of the solvent volatize in the gaseous environment over the displacement distance, such that a higher local polymer concentration forms in the outermost region of a nascent fiber as compared to the bulk of the dope. As discussed previously, the thin film such as thin film 101 ultimately present on the fabricated fiber may or may not be defect free.

Traversing the displacement distance between spinneret 206 and coagulation bath 208 thus results in a polymer rich region around the periphery of nascent fiber 207. The polymer rich region leads to formation of a thin film such as thin film 101 in fabricated fiber 100, and serves to maintain immobilized ionic liquid within the interconnected porous membrane of fabricated fiber 100.

Within the method, dope 204 is comprised from about 10-30 wt % polymer, less than about 30 wt % ionic liquid, and greater than about 50 wt % solvent. In certain embodiments, the polymer is a polyimide such as those known commercially as MATRIMID or UPILEX, a polyamide-imide such as known commercially as TORLON, or a biopolymer such as cellulose acetate. The choice of polymer is not limiting within the method disclosed, provided that the polymer is poorly soluble in the ionic liquid, and provided that the polymer is soluble in the solvent. The ionic liquid may be any ionic liquid provided that the polymer is poorly soluble in the ionic liquid, and provided that both the polymer and the ionic liquid are soluble in the solvent. The solvent must readily dissolve the polymer and the ionic liquid, so that dope 204 is a homogenous solution. Homogeneity of dope 204 may be achieved by various methods known in the art, for example stirring and de-aeration.

In an embodiment, dope 204 utilizes a polymer comprised of MATRIMID, a solvent comprised of N-methylpyrollidone (NMP), and an ionic liquid comprised of at least one of:
1-hexyl-3-methyl-imidazolium bistrifluorsulfonimide, or
1-octyl-3-methyl-4-phenyl-1H-1,2,3-triazol-3-ium bistrifluorsulfonimide, or
1-ethyl-3-methyl-imidazolium acetate, or 1-{2-[2-(2-methoxyethoxy)ethoxy]ethyl}-3-methyl-4-propyl-1,H-1,2,3-triazol-3-ium]bistrifluorsulfonimide, or 1-trimethylsilyl-3-methyl-4-propyl-1H-1,2,3-triazol-3-ium bistrifluorsulfonimide.

In another embodiment, dope 204 utilizes a polymer comprised of TORLON, a solvent comprised of N-methylpyrollidone (NMP), and an ionic liquid comprised of 1-hexyl-3-methyl-imidazolium bistrifluorsulfonimide.

In a further embodiment, dope 204 utilizes a polymer comprised of cellulose acetate, a solvent comprised of N-methylpyrollidone (NMP), and an ionic liquid comprised of 1-hexyl-3-methyl-imidazolium bistrifluorsulfonimide.

In a further embodiment, dope 204 is extruded through spinneret 206 at a temperature from about 20° C. to about 65° C., into a gaseous environment of air at atmospheric pressure and a temperature of approximately 25° C., and utilizing a displacement distance of approximately 50 centimeters.

The embodiments described above are meant to be exemplary only, and are not intended to be limiting. Within this disclosure, it is only necessary that dope 204 be comprised of a polymer, a solvent, and an ionic liquid, where the polymer is poorly soluble in the ionic liquid, and where the polymer and the ionic liquid are soluble in the solvent, such that the dope is comprised from about 10-30 wt % polymer and less than about 30 wt % ionic liquid, and greater than about 50 wt % solvent. Further, it is understood that the solvent may be comprised of a mixture, provided that the solubility relationships delineated above are observed. For example, in an embodiment, the solvent may be a mixture of N-methylpyrollidone (NMP) and Tetrahydrofuran (THF).

Those skilled in the art recognize that the acceptable dope compositions within the ranges disclosed here may be determined through trial and error, pre-existing knowledge, or through techniques such as cloud point analysis. Techniques are known for cloud point determination in systems such as that disclosed here, where the interaction between multiple components in a dope may not be fully represented by standard ternary diagram type representations. See e.g., Boom et al., "Equilibrium Thermodynamics of a Quaternary Membrane-Forming System with Two Polymers", *Macromolecules* vol. 27 (1994).

Having formed nascent fiber 207 over the displacement distance, nascent fiber 207 enters coagulation bath 208 comprised of a non-solvent and becomes forming fiber 211 upon crossing bath surface 212. The solvent is miscible with the non-solvent, and both the polymer and the ionic liquid are poorly soluble in the non-solvent. On immersion into coagulation bath 208, solvent diffuses from forming fiber 211 while some degree of non-solvent diffuses in. This increases the concentration of polymer and ionic liquid until the increased concentrations cause precipitation of the polymer and the ionic liquid. The higher local polymer concentration around the periphery and generated over the displacement distance forms a thin film such as thin film 101. Further, the diffusion of solvent diffuses from forming fiber 211 into coagulation bath 208 results in a co-precipitation of the polymer and the ionic liquid, such that the polymer precipitates to form a porous polymer network and the ionic liquid precipitates to form pockets of immobilized ionic liquid within the pores of the porous polymer network. Some degree of ionic liquid may also diffuse into the non-solvent. As a result of immersion in coagulation bath 208, forming fiber 211 continues to form as solvent and possibly some amount of ionic liquid diffuses into coagulation bath 208, and the polymer and the ionic liquid precipitate.

Generally speaking, during the coagulation process, the diffusive interchange between the non-solvent diffusing into forming fiber 211 and the solvent and possibly some ionic liquid diffusing out, the non-solvent crosses the bath side interface, the high polymer concentration layer, and an inner fluid core respectively. During the initial period, the high concentration layer is very thin and the interior of forming fiber 211 is a concentrated solution of solvent, polymer, and ionic liquid. The difference in concentration between the interior of forming fiber 211 and coagulation bath 208 provides a driving force to promote the diffusion in this period. Because the solvent concentration difference between concentrated solution and coagulation bath 208 is high, and because forming fiber 211 may contain loose structure with macroscopic voids, the solvent and non-solvent can interchange easily and diffusion proceeds at a high rate. However, as the diffusion continues, the thin skin of the forming fiber becomes thicker and denser, and the diffusion rate gradually lowers to the equilibrium condition based on the concentration difference between the concentrated solution in forming fiber 211 and coagulation bath 208.

The non-solvent comprising coagulation bath 208 is miscible with the solvent, and the polymer and the ionic liquid is poorly soluble in the non-solvent. Further, during the immersion in coagulation bath 208, the diffusion of solvent relative to the diffusion of ionic liquid, if any, is sufficient to produce a liquid-liquid demixing between the polymer and the ionic liquid, resulting in a co-precipitation to form the porous polymer network and immobilized ionic liquid contained therein. Typically, the diffusion of a known solvent in a dope such as dope 204 will exceed any diffusion of the ionic liquid sufficiently to produce a precipitation of ionic liquid in forming fiber 211. However, when necessary, a determination of relative diffusions between the solvent and the ionic liquid in the coagulation bath may be determined by methods known in the art. For example, the relative diffusions may be determined through cast-leaching by monitoring the composition of the coagulation bath during immersion of the forming fiber, as is known in the art. See e.g., Li et al., "Investigation of the Dynamics of Poly(ether sulfone) Membrane Formation by Immersion Precipitation", *Journal of Polymer Science: Part B: Polymer Physics*. Vol. 43, 498-510 (2005), among others. Relative diffusions may also be deduced through inspection of the fabricated fiber, or based on prior knowledge of the solvent-polymer-ionic liquid system. Within this process, it is only necessary that the diffusion rate of solvent into the coagulation bath be sufficiently greater than the diffusion rate of ionic liquid, if any, such that following a sufficient residence time in the coagulation bath, the fabricated fiber is comprised of a porous polymer network having ionic liquid immobilized within the pores of the network.

In certain embodiments where the polymer and the ionic liquid are insoluble in water, and where the solvent is comprised of N-methylpyrollidone (NMP), the non-solvent comprising coagulation bath 208 is water. However, this is not limiting within the process. Within the process, it is only necessary that the non-solvent is miscible with the solvent, that the polymer and the ionic liquid is poorly soluble in the non-solvent, and that the non-solvent interact with the solvent and ionic liquid such that the diffusion of solvent relative to the diffusion of ionic liquid, if any, is sufficient to produce a liquid-liquid demixing between the polymer and the ionic liquid over the residence time, resulting in a co-precipitation to form the porous polymer network and immobilized ionic liquid contained therein.

After a sufficient residence time in coagulation bath 208, fabricated fiber 200 having structure similar to fabricated fiber 100 is taken up by drum 210. As is understood, within the process disclosed here, the residence time of the forming fiber 211 in coagulation bath 208 means an amount of time necessary to confer a strength to forming fiber 211 sufficient to allow it to be extracted from coagulation bath 208 by drum 210. The residence time corresponds to the time during which forming fiber 211 interacts with coagulation bath 208, and governs the sturdiness of forming fiber 211. As is understood, an immersion period less than the residence time results in forming fiber 211 being too brittle for extraction without breaking. Those skilled in the art can determine a sufficient residence time by simple routine operations.

Utilizing a system such as that depicted at FIG. 2, the fabricated fiber may be produced as a solid fiber or a hollow fiber. As is known in the art, polymeric hollow fibers can be formed by extruding a polymer solution through an annular aperture in a spinneret, such as spinneret 206. Extrudate is prevented from collapsing by co-extruding a liquid or a gas in the center of the annulus to form the hollow region, commonly called the fiber bore or lumen. Such hollow fibers are utilized in a variety of applications, for example as hollow fiber membrane modules in the field of precision filtration. Such hollow fibers have also been utilized as the supporting structure in Supported Ionic Liquid Membranes (SILM). Generally, SILMs utilize incorporated ionic liquids to selectively facilitate mass transfer of a species through the membrane. Typically, SILMs are prepared by soaking a hollow porous fiber in an ionic liquid solution for a sufficient period of time to allow the ionic liquid to permeate the pores of the hollow fiber. As discussed supra, this can lead to problems associated with ionic liquid retention in the working environment. An advantage of the process as disclosed here is the production of a fabricated fiber wherein the ionic liquid is immobilized within the fabricated fiber following the dry-wet spinning process, and where the fabricated fiber is further comprised of a thin skin around the periphery to aid in retention of the ionic liquid.

The fabricated fiber produced by the method disclosed may be advantageously used for the production of fibers utilized in the separation of a chemical species from a mixture, when the polymer utilized effectively transports the chemical species, and when the ionic liquid has an effective absorption coefficient for the chemical species. For example, a fabricated fiber may be designed for the removal of $CO_2$ from a mixture such as a flue gas. When the ionic liquid has a varying sorption capacity for the chemical species as a function of temperature, the fabricated fiber may be exposed to the mixture at a first temperature, resulting in uptake of the chemical species from the mixture, followed by altering the temperature of the fabricated fiber to alter the sorption capacity and generate release of the chemical species.

An advantage of the fabricated fiber disclosed here in the separation of a chemical species from a mixture lies in the high area to volume ratios achievable by immobilizing a liquid within the pores of a porous polymer network. As is understood in the art, a high surface area to volume ratio is desired when a liquid-gas contact facilitates absorption and selective removal of a species from a gas. A high availability of surface area contact relative to the volume of the absorbing liquid increases the kinetics of the absorption, and reduces the inventory of the absorbing liquid required. For this reason, it is advantageous to achieve the smallest feasible volume of the contacting liquid allowable. For example, in a spray tower operation, a droplet size between 500-1000 µm may be desired in order to balance the desired high surface-to-volume ratio while maintaining droplet size above that which might be entrained and carried out of the spray tower. An advantage of this disclosure is availability to further reduce this limiting volume and further increase the kinetics by utilizing the porous polymer network of the fabricated fiber to immobilize an absorbing liquid and provide support against a gaseous flow, in order to mitigate loss of the liquid in the operating environment. For example, the fabricated fibers of this disclosure may have diameters between 250-1500 µm, with immobilized liquids within the porous polymer network having necessarily smaller dimension. The disclosure thus provides a mechanism by which contact between a gaseous flow and an immobilized liquid may be facilitated in a manner which allows reduced immobilized liquid volumes over those which might otherwise be achievable. This advantage becomes of greater significance when the immobilized liquid is a relatively high viscosity liquid such as a typical ionic liquid, where pumping costs may be significant and achieving sufficient reduced droplet sizes may be problematic.

In an operation such as that described above, when the fabricated fiber is a hollow fiber, the temperature of the fabricated fiber may be altered through thermal interaction with a fluid flowing through the hollow interior. For example, at FIG. 3, a hollow fabricated fiber generally indicated at 300 is produced by the method disclosed and has a structure similar to fabricated fiber 100, where thin film 101 is supported by a porous polymer network 102, and an ionic liquid is immobilized within the pores of porous polymer network 102. At FIG. 3, fabricated fiber 300 is produced from a dope comprised of a polymer having an affinity for a chemical species and an ionic liquid known to absorb the chemical species. Fabricated fiber 300 is exposed to a gaseous mixture comprised of the chemical species, such as flow 312, at a first temperature, resulting in an uptake of the chemical species from flow 312. Flow 312 is represented as a cross-flow at FIG. 1; however, flow 312 may have any advantageous orientation with respect to fabricated fiber 300.

Following uptake of the chemical species, fabricated fiber 300 may be removed from flow 312 and the temperature of fabricated fiber 300 increased to a second temperature by the action of fluid 313 flowing through the hollow interior of fabricated fiber 300. The ionic liquid comprising fabricated fiber 300 has a reduced sorption capacity for the chemical species at the second temperature, resulting in a release of the chemical species from fabricated fiber 300.

For example, a fabricated fiber may be designed for the removal of $CO_2$ from a mixture such as a flue gas. Such a $CO_2$-selective fabricated fiber may be produced from a dope comprised of a polyimide such as MATRIMID having an affinity for $CO_2$ over other gases in the mixture, an ionic liquid known to absorb $CO_2$ such as 1-hexyl-3-methyl-imidazolium bistrifluorsulfonimide, and a solvent known to be common such as N-methylpyrollidone (NMP). Fluid 313 may be a flow of steam directed through the hollow interior of fabricated fiber 300 in order to increase the temperature of the ionic liquid comprising fabricated fiber 300. The hollow interior of fabricated fiber 300 may be surface treated to limit permeation of fluid 313 into fabricated fiber 300.

It is further understood that a hollow fabricated fiber such as fabricated fiber 300 may function as a membrane, such that chemical species uptake from flow 312 occurs simultaneously with removal of the chemical species into the annulus of fabricated fiber 300. In such an operation, the partial pressure of the chemical species in a mixture such as flow 312 exceeds the partial pressure of the chemical species within the hollow annulus, providing for transport of the chemical species from flow 312 into the interior of fabricated fiber 300. The partial pressure of the chemical species within the hollow annulus of fabricated fiber 300 may be maintained below the partial pressure in flow 312 using various means known in the art. For example, a vacuum pump may be in fluid communication with the hollow annulus, or flow 312 may be a compressed flow exiting a compressor, or a sweeping gas such as flow 313 may flow through the hollow annulus.

Figure 3:
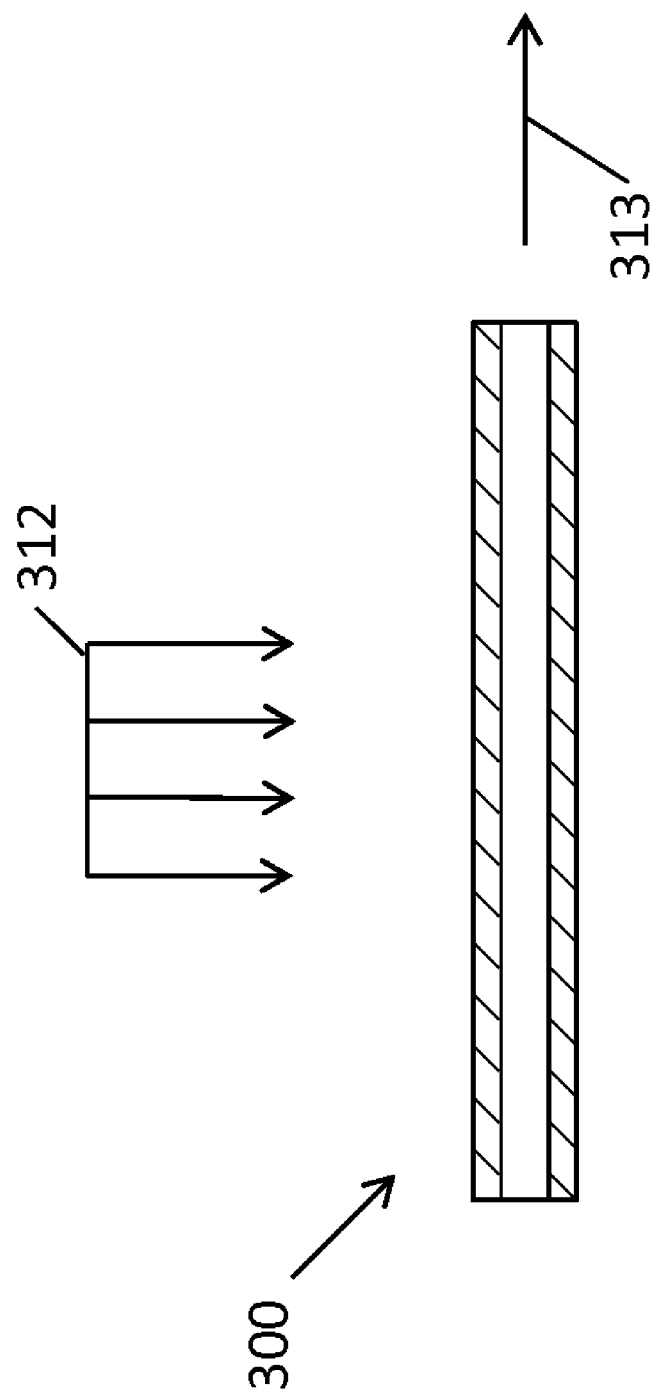
FIG. 3 illustrates gaseous separation processes utilizing a hollow fabricated fiber.

It is further understood that a plurality of fabricated fibers may be utilized simultaneously in a separation operation similar to those discussed with reference to FIG. 3. The plurality of fabricated fibers may be packaged into a suitable module following fabrication in order to provide logistical ease in the operating environment. Suitable modularization geometries and techniques are known the art. See e.g., U.S. Pat. No. 6,890,436 to Komatsu et al., issued May 10, 2005, among others.

In terms of material selection for production of fabricated fibers intended for a separation of a specific chemical species, it may be advantageous to initially choose the ionic liquid based on its solubility and solubility selectivity for the specific chemical species relative to other components which may be in a mixture, as well as the thermal and chemical stability of the ionic liquid over expected temperatures and pressures of operation. Based on the ionic liquid selected, compatible polymers may then be identified, based on poor solubility with the identified ionic liquid and thermal, chemical, and mechanical stability in the temperature range of the targeted application, among other possible considerations. Ideally, the polymer will also have a high solubility and diffusivity for the specific chemical species to facilitate transport into the fabricated fiber. The solvent may then be chosen based on the polymer and ionic liquid, and should readily dissolve both the polymer and ionic liquid. Finally, the nonsolvent may be chosen based on the other components. It should be miscible with the solvent, but should have poor solubility for both the polymer and the ionic liquid. Ideally, the nonsolvent is also cheap and non-toxic, since it may be required in larger amounts than any of the other components.

As an example, when selecting materials for production of $CO_2$-selective fabricated fibers, and speaking generally, the ionic liquid may be chosen first based on its performance in $CO_2$ capture. For capture from flue gas, the ionic liquid should preferably have a $CO_2$ solubility comparable to or greater than that of monoethanolamine, and a solubility selectivity for $CO_2$ over $N_2$ and $O_2$ preferably exceeding 20. Additionally, thermal and chemical stability as quantified by thermogravimetric analysis decomposition onset temperature should preferably exceed 150° C., and the energy required for $CO_2$ removal from the ionic liquid should preferably be less than 25 kcal/mol. For capture from fuel gas mixtures, including synthesis gas and raw natural gas, the ionic liquid should preferably have $CO_2$ solubility comparable to or greater than that of polyethylene glycol dimethyl ether, and the solubility selectivity for $CO_2$ over $H_2$ and $CH_4$ should preferably exceed 20. Further, thermal and chemical stability as quantified by thermogravimetric analysis decomposition onset temperature should preferably exceed 100° C., and the energy required for $CO_2$ removal from the ionic liquid should preferably be less than 15 kcal/mol. As before, and based on the specific ionic liquid selected, a compatible polymers may then selected based on thermal, chemical, and mechanical stability in the temperature range of the targeted application, and based on poor solubility with the selected ionic liquid. Ideally, the polymer has high solubility and diffusivity for $CO_2$ to facilitate transport into the fiber. Finally, the solvent is chosen based on the polymer and ionic liquid. The solvent must readily dissolve both the polymer and ionic liquid, and preferably it should also be relatively non-volatile, with a normal boiling point of 100-250° C.

The process as disclosed thereby provides a fabricated fiber having a thin skin around the periphery of the fiber and supported by a porous polymer network, where the porous polymer network contains immobilized ionic liquid. The process produces the fabricated fiber in a dry-wet spinning process using a homogenous dope solution comprised of from about 10-30 wt % polymer, less than about 30 wt % ionic liquid, and greater than about 50 wt % solvent. The dope is extruded through a spinneret over a displacement distance in a gaseous environment in order to form a polymer-rich region around the periphery of the nascent fiber, then immersed in a coagulation bath of non-solvent in order to co-precipitate a porous polymer network and immobilized ionic liquid within the pores. The method provides significant advantage over current fabrication methods for liquid-supporting polymers, including more rapid fabrication and improved retention of the ionic liquid over operational cycles. The fabricated fibers may be effectively utilized for the separation of a chemical species from a mixture based on the selection of the polymer, the ionic liquid, and the solvent utilized in the dope.

Thus, the disclosure herein provides a method for production of a fabricated fiber comprised of a porous polymer network and an immobilized ionic liquid within the pores of the network.

Further, the disclosure herein provides a method for production of a fabricated fiber comprised of a porous polymer network and an immobilized ionic liquid within the pores of the network, where the porous polymer network is asymmetric to mitigate loss of the ionic liquid to a surrounding environment.

Further, the disclosure herein provides a method for production of a fabricated fiber comprised of an asymmetric polymer network and immobilized ionic liquid utilizing a wet-dry spinning process, in order to avoid separate fabrication steps of fiber spinning and subsequent ionic liquid soaking.

Further, the disclosure herein provides a method for production of a fabricated fiber comprised of an asymmetric polymer network and immobilized ionic liquid, where the fabricated fiber is suitable for use in the separation of specific chemical species from a mixture.

Further, the disclosure herein provides a method for production of a fabricated fiber comprised of an asymmetric polymer network and immobilized ionic liquid, where the fabricated fiber is suitable for use in the separation of specific chemical species from a mixture, and to provide a method of facilitating the separation utilizing the fabricated fiber.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of producing a fabricated fiber comprised of a porous polymer network and an immobilized ionic liquid, comprising:

preparing a dope comprised of the polymer, a solvent, and an ionic liquid, where the polymer is poorly soluble in the ionic liquid, and where the polymer and the ionic liquid are soluble in the solvent, and where the dope is comprised from 10-30 wt % of the polymer, less than about 30 wt % ionic liquid, and greater than about 50 wt % solvent;

forming a nascent fiber by extruding the dope through a spinneret and into a gaseous environment over a displacement distance, where the displacement distance separates the spinneret and a coagulation bath, such that the nascent fiber exits the spinneret and travels over the displacement distance, and such that at least some volatiles in the solvent evaporate in the gaseous environment, such that a polymer rich region forms where the nascent fiber contacts the gaseous environment;

introducing the nascent fiber into the coagulation bath and generating a forming fiber, where the coagulation bath is comprised of a non-solvent, where the non-solvent is miscible with the solvent, and where the polymer is poorly soluble in the non-solvent, and where the ionic liquid is poorly soluble in the non-solvent, and maintaining the forming fiber in the coagulation bath for a residence time, such that a quantity of solvent diffuses from the forming fiber into the non-solvent over the residence time, and such that the quantity of solvent is sufficient to cause at least a portion of the polymer to precipitate to form the porous polymer network and sufficient to cause at least a portion of the ionic liquid to precipitate to form the immobilized ionic liquid within the pores of the porous polymer network; and withdrawing the forming fiber from the coagulation bath to generate the fabricated fiber, thereby producing the fabricated fiber comprised of the polymer and immobilized ionic liquid.

2. The method of claim 1 where the ionic liquid absorbs a chemical species.

3. The method of claim 2 where the spinneret has a geometry such that the nascent fiber exiting the spinneret has an annular cross-section, and such that the fabricated fiber is a hollow fiber.

4. The method of claim 2 including separating the chemical species from the mixture by exposing the fabricated fiber to a mixture comprised of the chemical species, thereby separating the chemical species from the mixture.

5. The method of claim 4 where the ionic liquid has a first sorption capacity for the chemical species at a first temperature, and where the ionic liquid has a second sorption capacity for the chemical species at a second temperature, and where the first sorption capacity is greater than the second sorption capacity, and where exposing the fabricated fiber to the mixture occurs at the first temperature, and further comprising regenerating the immobilized ionic liquid following the exposure by altering the temperature of the fabricated fiber from the first temperature to the second temperature.

6. The method of claim 5 where the spinneret has a geometry such that the fabricated fiber has an annular cross-section with an inner radius and an outer radius, such that the fabricated fiber is a hollow fiber having a hollow interior bounded by the inner radius, and where altering the temperature of the fabricated fiber from the first temperature to the second temperature is accomplished by heat transfer between the fabricated fiber and a fluid flowing through the hollow interior.

7. The method of claim 5 where the fabricated fiber comprises a plurality of fibers, and where each fiber in the plurality of fibers is produced in the manner of claim 1 using the polymer, the solvent, and the ionic liquid.

8. The method of claim 2 where the spinneret has a geometry such that the fabricated fiber has an annular cross-section with an inner radius and an outer radius, such that the fabricated fiber is a hollow fiber having a hollow interior bounded by the inner radius and such that the fabricated fiber has an exterior surface at the outer radius, and including separating the chemical species from the mixture by:

exposing the exterior surface to the mixture, where the mixture has a first partial pressure, and where the first partial pressure is the partial pressure of the chemical species in the mixture; and maintaining the hollow interior at a second partial pressure less than the first partial pressure, where the second partial pressure is the partial pressure of the chemical species in the hollow interior, thereby separating the chemical species from the mixture.

9. The method of claim 8 where the fabricated fiber comprises a plurality of fibers, and where each fiber in the plurality of fibers is produced in the manner of claim 1 using the polymer, the solvent, and the ionic liquid.

10. A method of utilizing a fabricated fiber comprised of a porous polymer network and an immobilized ionic liquid for the separation of a chemical species from a mixture comprised of the chemical species, comprising:

providing the fabricated fiber, where the fabricated fiber is produced by, preparing a dope comprised of the polymer, a solvent, and an ionic liquid, where the polymer is poorly soluble in the ionic liquid, and where the polymer and the ionic liquid are soluble in the solvent, and where the dope is comprised from 10-30 wt % of the polymer, less than about 30 wt % ionic liquid, and greater than about 50 wt % solvent, and where the ionic liquid absorbs the chemical species, forming a nascent fiber by extruding the dope through a spinneret and into a gaseous environment over a displacement distance, where the displacement distance separates the spinneret and a coagulation bath, such that the nascent fiber exits the spinneret and travels over the displacement distance, and such that at least some volatiles in the solvent evaporate in the gaseous environment, such that a polymer rich region forms where the nascent fiber contacts the gaseous environment, introducing the nascent fiber into the coagulation bath to generate a forming fiber, where the coagulation bath is comprised of a non-solvent, where the non-solvent is miscible with the solvent, and where the polymer is poorly soluble in the non-solvent, and where the ionic liquid is poorly soluble in the non-solvent, and maintaining the forming fiber in the coagulation bath for a residence time, such that a quantity of solvent diffuses from the forming fiber into the non-solvent over the residence time, and such that the quantity of solvent is sufficient to cause at least a portion of the polymer to precipitate to form the porous polymer network and sufficient to cause at least a portion of the ionic liquid to precipitate to form the immobilized ionic liquid within the pores of the porous polymer network and, removing the forming fiber from the coagulation bath to generate a fabricated fiber comprised of the immobilized ionic liquid; and exposing the fabricated fiber to the mixture, thereby utilizing the fabricated fiber comprised of the porous polymer network and the immobilized ionic liquid for the separation of the chemical species from the mixture comprised of the chemical species.

11. The method of claim 10 where the spinneret has a geometry such that the fabricated fiber has an annular cross-section with an inner radius and an outer radius, such that the fabricated fiber is a hollow fiber having a hollow interior bounded by the inner radius and such that the fabricated fiber has an exterior surface at the outer radius.

12. The method of claim 10 where the ionic liquid has a first sorption capacity for the chemical species at a first temperature, and where the ionic liquid has a second sorption capacity for the chemical species at a second temperature, and where the first sorption capacity is greater than the second sorption capacity, and where exposing the fabricated fiber to the mixture occurs at the first temperature, and further comprising regenerating the immobilized ionic liquid following the exposure by altering the temperature of the fabricated fiber from the first temperature to the second temperature.

13. The method of claim 12 where the fabricated fiber comprises a plurality of fibers, and where each fiber in the plurality of fibers is produced in the manner described by claim 10 using the polymer, the solvent, and the ionic liquid.

14. The method of claim 12 where the spinneret has a geometry such that the fabricated fiber has an annular cross-section with an inner radius and an outer radius, such that the fabricated fiber is a hollow fiber having a hollow interior bounded by the inner radius, and where altering the temperature of the fabricated fiber from the first temperature to the second temperature is accomplished by heat transfer between the fabricated fiber and a fluid flowing through the hollow interior.

15. The method of claim 10 where the spinneret has a geometry such that the fabricated fiber has an annular cross-section with an inner radius and an outer radius, such that the fabricated fiber is a hollow fiber having a hollow interior bounded by the inner radius and such that the fabricated fiber has an exterior surface at the outer radius, and where exposing the fabricated fiber to the mixture is accomplished by exposing the exterior surface to the mixture, where the mixture has a first partial pressure, and where the first partial pressure is the partial pressure of the chemical species in the mixture and further comprising:
maintaining the hollow interior at a second partial pressure less than the first partial pressure, where the second partial pressure is the partial pressure of the chemical species in the hollow interior.

16. A method of providing contact between a gaseous flow and an immobilized liquid utilizing a fabricated fiber, comprising:
providing the fabricated fiber, where the fabricated fiber is produced by,
preparing a dope comprised of a polymer, a solvent, and a liquid, where the liquid has the same composition as the immobilized liquid, and where the polymer is poorly soluble in the liquid, and where the polymer and the liquid are soluble in the solvent, and where the dope is comprised from 10-30 wt % of the polymer, less than about 30 wt % of the liquid, and greater than about 50 wt % solvent,
forming a nascent fiber by extruding the dope through a spinneret and into a gaseous environment over a displacement distance, and where the displacement distance separates the spinneret and a coagulation bath, such that the nascent fiber exits the spinneret and travels over the displacement distance, and such that at least some volatiles in the solvent evaporate in the gaseous environment, such that a polymer rich region forms where the nascent fiber contacts the gaseous environment,
introducing the nascent fiber into the coagulation bath and generating a forming fiber, where the coagulation bath is comprised of a non-solvent, where the non-solvent is miscible with the solvent, and where the polymer is poorly soluble in the non-solvent, and where the liquid is poorly soluble in the non-solvent, and maintaining the forming fiber in the coagulation bath for a residence time, such that a mass quantity of solvent diffuses from the forming fiber into the non-solvent over the residence time, and such that the mass quantity of solvent is sufficient to cause at least a portion of the polymer to precipitate to form a porous polymer network and sufficient to cause at least a portion of the liquid to precipitate to form immobilized liquid within the pores of the porous polymer network and,
removing the forming fiber from the coagulation bath to generate the fabricated fiber comprised of the immobilized liquid; and
exposing the fabricated fiber to the gaseous flow,
thereby providing contact between the gaseous flow and the immobilized liquid utilizing the fabricated fiber.

17. The method of claim 16 where the liquid is an ionic liquid and where the ionic liquid absorbs a chemical species, and where the gaseous flow is comprised of the chemical species, and further comprising removing the chemical species from the gaseous flow as a result of providing contact between the gaseous flow and the immobilized liquid utilizing the fabricated fiber.

18. The method of claim 17 where the ionic liquid has a first sorption capacity for the chemical species at a first temperature, and where the ionic liquid has a second sorption capacity for the chemical species at a second temperature, and where the first sorption capacity is greater than the second sorption capacity, and where exposing the fabricated fiber to the gaseous flow occurs at the first temperature, and further comprising regenerating the immobilized liquid following the exposure by altering the temperature of the fabricated fiber from the first temperature to the second temperature.

19. The method of claim 18 where the spinneret has a geometry such that the fabricated fiber has an annular cross-section with an inner radius and an outer radius, such that the fabricated fiber is a hollow fiber having a hollow interior bounded by the inner radius, and where altering the temperature of the fabricated fiber from the first temperature to the second temperature is accomplished by heat transfer between the fabricated fiber and a fluid flowing through the hollow interior.

20. The method of claim 17 where the spinneret has a geometry such that the fabricated fiber has an annular cross-section with an inner radius and an outer radius, such that the fabricated fiber is a hollow fiber having a hollow interior bounded by the inner radius and such that the fabricated fiber has an exterior surface at the outer radius, and where exposing the fabricated fiber to the gaseous flow is accomplished by exposing the exterior surface to the gaseous flow, where the gaseous flow has a first partial pressure, and where the first partial pressure is the partial pressure of the chemical species in the gaseous flow, and further comprising:
maintaining the hollow interior at a second partial pressure less than the first partial pressure, where the second partial pressure is the partial pressure of the chemical species in the hollow interior.

* * * * *